United States Patent
Kato et al.

(10) Patent No.: US 9,292,335 B2
(45) Date of Patent: Mar. 22, 2016

(54) INFORMATION PROCESSING DEVICE AND PROGRAM

(75) Inventors: Sadaatsu Kato, Tokyo (JP); Takahiro Ohori, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/110,752

(22) PCT Filed: Sep. 3, 2012

(86) PCT No.: PCT/JP2012/072315
§ 371 (c)(1),
(2), (4) Date: May 9, 2014

(87) PCT Pub. No.: WO2013/035659
PCT Pub. Date: Mar. 14, 2013

(65) Prior Publication Data
US 2014/0245329 A1    Aug. 28, 2014

(30) Foreign Application Priority Data
Sep. 5, 2011    (JP) .................................. 2011-192894

(51) Int. Cl.
G06F 3/00 (2006.01)
G06F 9/46 (2006.01)
G06F 9/54 (2006.01)
H04M 1/725 (2006.01)
G06F 9/445 (2006.01)

(52) U.S. Cl.
CPC ............ G06F 9/465 (2013.01); G06F 9/44505 (2013.01); G06F 9/54 (2013.01); H04M 1/72522 (2013.01)

(58) Field of Classification Search
CPC .......................................................... G06F 9/54
USPC ................................................... 719/310, 328
See application file for complete search history.

(56) References Cited

U.S. PATENT DOCUMENTS 8,464,236 B2 *  6/2013  Woersching et al. ......... 717/165
2005/0131857 A1 *  6/2005  Fujiki et al. ....................... 707/1
(Continued)

FOREIGN PATENT DOCUMENTS

JP    09-147019 A    6/1997
JP    2003-338855 A    11/2003
(Continued)

OTHER PUBLICATIONS

Erhard Rahm, A survey of approaches to automatic schema matching, 2001.*
(Continued)

Primary Examiner — Lechi Truong
(74) Attorney, Agent, or Firm — MKG, LLC (57) ABSTRACT

An information-processing device includes: a storage unit that stores parameter types used in executing application proms, each parameter type associated with an identifier of an application program; a setting unit that sets a value for a parameter used in executing a first application; a determination unit that determines, based on an association between the identifiers and parameter types, which association is stored in the storage unit, at least one second application program that uses a parameter of a parameter type the same as a parameter type for which a value is set by the setting unit; and an incorporating unit that incorporates the value for the parameter set by the setting unit into a value for a parameter used in executing the at least one second application program determined by the determination unit.

8 Claims, 3 Drawing Sheets

(56) References Cited

U.S. PATENT DOCUMENTS

2008/0228775 A1* 9/2008 Abhyanker et al. ............ 707/10
2012/0233567 A1* 9/2012 Brown et al. ................. 715/810

FOREIGN PATENT DOCUMENTS

| JP | 2006-157082 A | 6/2006 |
|---|---|---|
| WO | 2010018455 A1 | 2/2010 |

OTHER PUBLICATIONS

International Search Report issued in corresponding PCT Application No. PCT/JP2012/072315 dated Oct. 2, 2012.

Extended European Search Report for Application No. 12829764.5-1954/2755366, dated Apr. 9, 2015.

* cited by examiner

| APPLICATION ID |
|---|
| ITEM |
| VALUE |

FIG. 5A

| A1 |
|---|
| LIGHTING |
| 20% |

FIG. 5B

INFORMATION PROCESSING DEVICE AND PROGRAM

TECHNICAL FIELD

The present invention relates to setting of a value of a parameter used in executing an application program by an information-processing device.

BACKGROUND

In some cases, information processing devices can execute two or more application programs. In this connection, cases exist where a parameter(s) referred to when an application program is executed has a value that is the same as that of a value(s) referred to by another application program. In these cases, generally it is necessary for a user to set a parameter(s) for each application program individually.

In regard to the foregoing, techniques for reducing an amount of work for a user in setting such a parameters have been proposed. JP2003-338855-A discloses a communication terminal, in which two or more such operation modes are implemented corresponding respectively to a where the terminal is in a sleep state and is in a work state. After an operation mode is set, a setting for two or more functionalities is initiated according to an operation mode. JP2006-157082-A discloses a method of changing collectively a setting of a volume for application programs according to a volume set for controlling coefficients; the volume set is defined for each application. JPH09-147019 discloses an information processing device in which in an event that a business trip is registered in a scheduler, a user is prompted to change setting parameters used for performing communication or for ringing an alarm, which parameters are estimated for change, as necessary, in association with the event, and are changed upon receipt of an approval from the user.

In the technology disclosed in JP2003-338855-A, it is necessary to determine a combination of detailed data items required for defining an operation mode. In addition, the technology disclosed in JP2003-338855-A involves a problem in that a user is not able to operate the terminal other than in predetermined operation modes. In the technology disclosed in JP2006-157082-A, selectable parameters are limited to a volume control, and thus a user is not able to select a preferred selectable parameter from different types of parameters. In the technology disclosed in JPH09-147019-A, upon completion of setting of an application program a user is prompted to set parameters for other application programs. The technology disclosed in JPH09-147019-A involves a problem in that a user is required to input parameters for each other application program individually.

SUMMARY OF THE INVENTION

An object of the present invention is to set parameters collectively for a plurality of application programs to which parameters of a same type refer.

In an aspect of the present invention, there is provided an information-processing device including: a storage unit that stores parameter types used in executing application programs, each parameter type associated with an identifier of an application program; a setting unit that sets a value for a parameter used in executing a first application; a determination unit that determines, based on an association between the identifiers and parameter types, which association is stored in the storage unit, at least one second application program that uses a parameter of a parameter type the same as a parameter type for which a value is set by the setting unit; and an incorporating unit that incorporates the value for the parameter set by the setting unit into a value for a parameter used in executing the at least one second application program determined by the determination unit.

Preferably, the information-processing device further includes: a notification unit that notifies a user of the at least one second application program determined by the determination unit; and a selection unit that selects from the at least one second application program determined by the determination unit at least one application program, wherein the incorporating unit incorporates the value for the parameter set by the setting unit into a value for a parameter used in executing the at least one application program selected by the selection unit.

Preferably, the information-processing device further includes: an accumulating unit that accumulates a history of selections made by the selection unit; and a changing unit that analyzes the history accumulated by the selection unit and changes, based on a result of the analysis, parameter types stored in association with the identifiers in the storage unit.

Preferably, the information-processing device further includes a measuring unit that measures a physical quantity of an environment of the information processing device, wherein the incorporating unit incorporates the value of the parameter based on the physical quantity measured by the measuring unit.

Preferably, the information-processing device further includes an obtaining unit that obtains location information indicative of a position of the information-processing device, wherein the incorporating unit incorporates the value of the parameter based on the location information obtained by the obtaining unit.

Preferably, the information-processing device further includes: a communication unit that communicates with another device; and an obtaining unit that obtains information indicative of a status of a communication performed by the communication unit, wherein the incorporating unit incorporates the value for the parameter based on the information obtained by the obtaining unit.

Preferably, the storage unit further stores information indicative of whether the incorporation of the value for the parameter by the incorporating unit is allow or prohibited; and the incorporating unit incorporates the value for the parameter set by the setting means to a value for a parameter used in executing application program registered as an application program to which the incorporation is allowable in the storage unit.

Preferably, wherein: the storage unit further stores a condition; and the determination unit excludes an application program satisfying the condition stored in the storage unit from selectable application programs.

In another aspect of the present invention, there is provided a computer program that causes a computer to execute: registering parameter types used in executing application programs, each parameter type associated with an identifier of an application program; setting a value for a parameter used in executing a first application; determining, based on the association between the identifiers and parameter types, at least one second application program that uses a parameter of a parameter type the same as a parameter type for which a value is set; and incorporating the value for the set parameter into a value for a parameter used in executing the determined at least one second application program.

According to the present invention, it is possible to set collectively parameters for two or more application programs in which parameters of the same type is used.

DETAILED DESCRIPTION

1. Embodiment

1-1. Configuration of Information Processing Device

Figure 1:
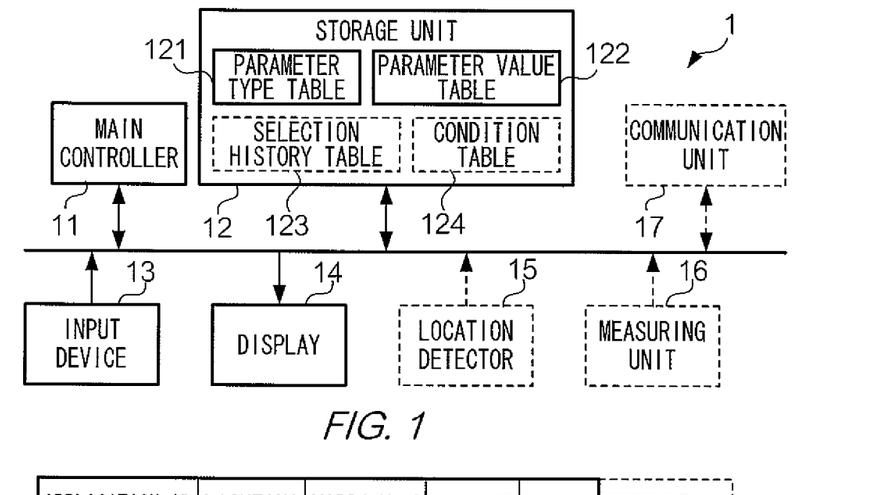
FIG. 1 shows a configuration of an information processing device according to an embodiment.

FIG. 1 shows a configuration of an information processing device 1 according to an embodiment of the invention. Main controller 11 includes a CPU (CENTRAL PROCESSING UNIT), ROM (READ ONLY MEMORY), RAM (RANDOM ACCESS MEMORY). The CPU reads operating software from storage unit 12 to the RAM under control of a boot loader stored in the ROM. Operating software includes a program that executes an operating system. The CPU executes the program to control all of the units of information processing device 1.

Input device 13 includes buttons for inputting instructions, a sensor and other input devices, and supplies, upon receipt of an input instruction by a user, a signal indicative of the instruction to main controller 11. Display 14 is a display device, in which a liquid crystal panel or other imaging devices is implemented, and which displays an image according to a signal supplied from the main controller 11.

Storage unit 12 is a solid-state drive, hard drive, EEPROM (ELECTRICALLY ERASABLE AND PROGRAMMABLE READ ONLY MEMORY), or other storing means. Storage unit 12 stores the operating software described above and application programs (hereinafter referred to as applications) that describe a procedure of processing to perform a particular functionality. Applications are interpreted and executed in parallel by main controller 11 while the operating system executed. In addition, storage unit 12 stores a parameter type table 121 and parameter value table 122.

Figure 2:
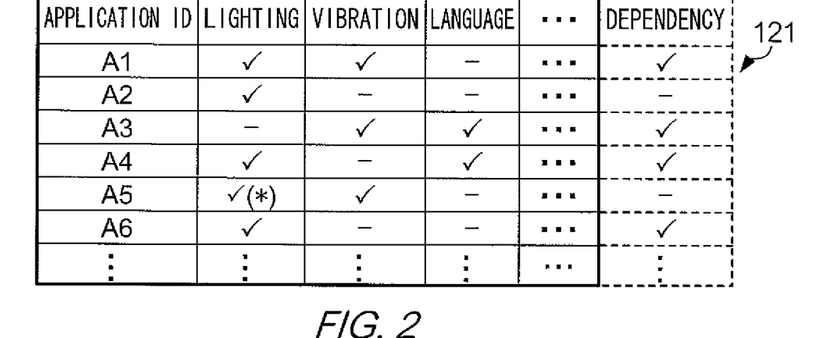
FIG. 2 is an example of a parameter type table.

FIG. 2 consists of an example of parameter type table 121. Parameter type table 121 is a table in which a set of parameter types is associated with identification information (hereinafter referred to as an application ID) of an application executable by information-processing device 1, which device refers to the parameters when executed. From the example in FIG. 2, it can be seen that parameter type table 121 shows that a checkmark in a matrix indicates that a parameter type in the same column in the same line is referred to by an application in the same line when executed. On the other hand, a parameter type of a column indicated by '-' is not referred to by an application in the same line when executed. For example, parameter type table 121 in FIG. 2 shows that an application indicated by an application ID 'A1' refers to values of parameter types 'lighting' and 'vibration,' and does not refer to a value of a parameter type 'language.'

Figure 3:
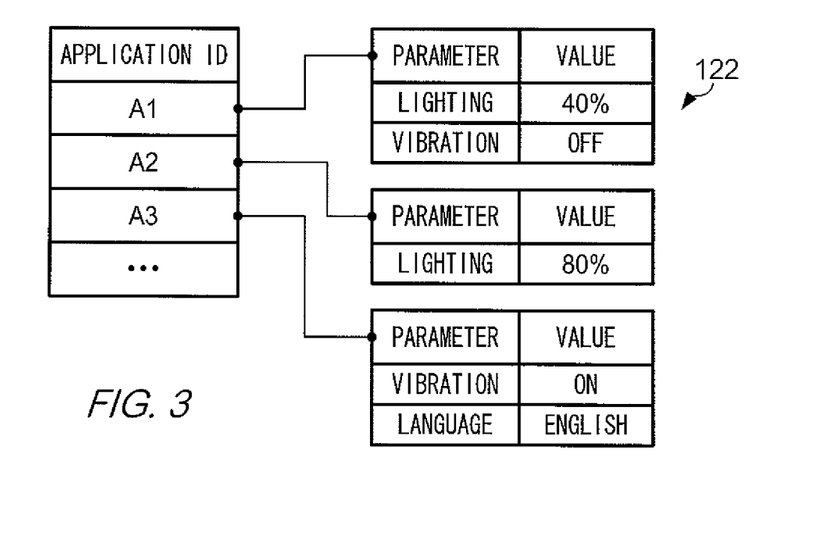
FIG. 3 is an example of a parameter value table.

FIG. 3 is an example of parameter value table 122. Parameter value table 122 includes values of parameters referred to by applications for each application ID. A value(s) of the parameter(s) is referred to and used by main controller 11 when the respective application is executed. In the example in FIG. 3, for the application indicated as application ID A1 a value of 40% for the parameter 'lighting' is indicated and a value 'OFF' is indicated for the parameter 'vibration.' Accordingly, information-processing device 1 executes an application A1 at 40% of maximum brightness without activating a vibrator. Also in the example in FIG. 3, application ID A3 sets a value 'ON' for the parameter 'vibration' and a value 'English' for the parameter 'language.' This means that information-processing device 1 activates a vibrator and displays operating instructions or other messages notified to a user in English upon execution of the application A3.

1-2. Functional Configuration of Information Processing Device

Figure 4:
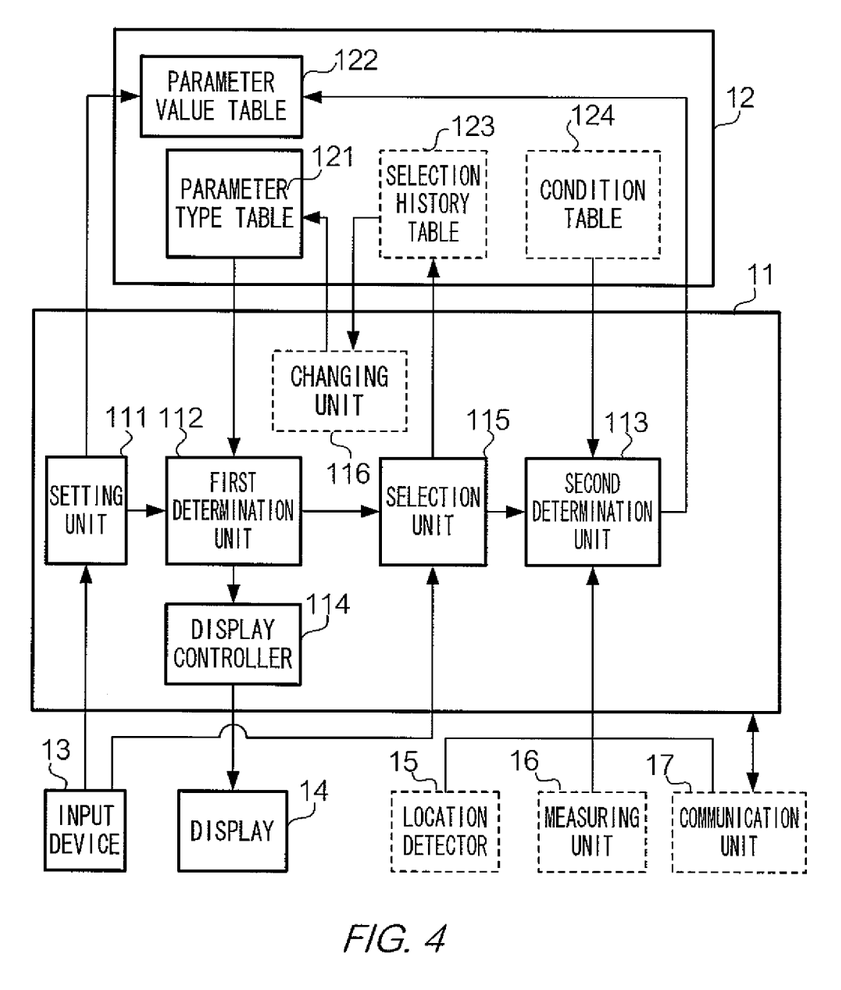
FIG. 4 shows a functional configuration of an information-processing device.

FIG. 4 shows a functional configuration of information processing device 1. As shown in FIG. 4, main controller 11 of information processing device 1 performs functionalities of a setting unit 111, determination unit 112, incorporating unit 113, notifying unit 114, and selection unit 115. Setting unit 111 sets a value of a parameter referred to during execution of an application according to a user's instruction provided at input device 13.

Figure 5A:
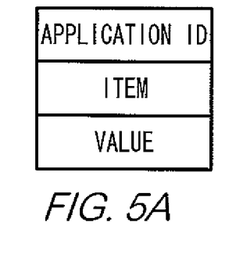
FIG. 5 shows information received from a setting unit via an input device.

FIG. 5 includes details of information obtained by setting unit 111 from input device 13. FIG. 6 consists of an example of a setting screen displayed on display 14 of information processing device 1. Upon receipt of an instruction provided by a user at input device 13, setting unit 111 determines a data set including a parameter type to be set, a value of the parameter, and an application ID of an application for which the value is set, as shown in FIG. 5A. Setting unit 111 writes the value of the parameter included in the data set in a field of parameter value table 122 determined by the application ID and the parameter type.

Figure 5B:
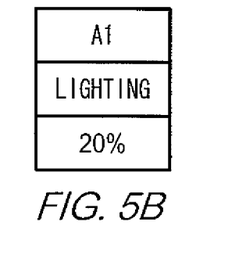
Figure 6A:
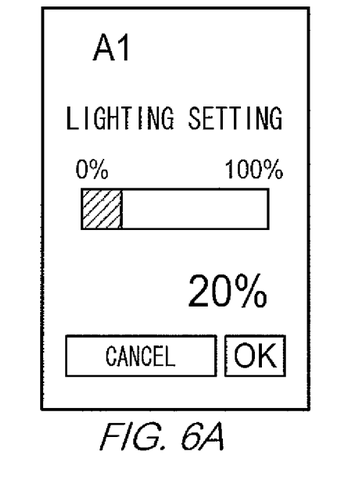
FIG. 6 is an example of a setting a screen displayed on a display of the information-processing device.

For example, in a setting screen for the application whose application ID is A1 in FIG. 6A, when a user sets lighting to 20%, setting unit 111 determines the data set shown in FIG. 5B. In this case, setting unit 111 determines a parameter type 'lighting' associated with application ID A1 in parameter value table 122 and sets the value at '20%.'

Next, setting unit 111 transfers the data set to determination unit 112 shown in FIG. 4. First determination unit 112 determines, by referring to parameter type table 121, an application ID of an application that refers to the parameter type indicated by the date set, the application being different from the application indicated by the data set. Display controller 114 displays an application ID determined by determination unit 112, to provide notification to the user. Specifically, notifying unit 114 displays a list of determined application IDs on display 14.

Figure 6B:
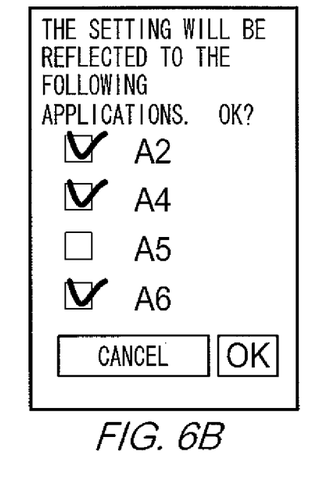

As an example, when the data set shown in FIG. 5B is supplied from setting unit 111, determination unit 112 determines, by referring to parameter type table 121 shown in FIG. 2, application IDs of applications other than A1, which refer to a value of a parameter "lighting." As a result, A2, A4, A5, and A6 are extracted by determination unit 112. Display controller 114 displays a list of the application IDs determined by determination unit 112 on display 14. A screen in FIG. 6B is an example of a screen displayed on display 14 by notifying unit 114. On the screen, a message 'Is it okay to apply the setting to the application(s) shown below?' is displayed. A list of the application IDs A2, A4, A5, and A6 is displayed below the message, each application ID in the list having a check box. In this example, application IDs are displayed on display 14. Alternatively, a name of an application, icon or other objects associated with an application may be displayed. Stated simply, the list indicates an application(s) identifiable by the user.

When input device 13 receives an input provided by a user in response to a content displayed by notifying unit 114, selection unit 115 determines an application ID selected by the user from the displayed application IDs, and transfers the selected application ID to incorporating unit 113. For example, as in FIG. 6B, on a screen in which A2, A4, A5, and A6 are displayed and only A5 is not checked, when the user clicks on the OK button, selection unit 115 selects the application IDs A2, A4, and A6 whose corresponding checkboxes are checked and transfers the IDs to incorporating unit 113.

Second determination unit 113 extracts a parameter type(s) that is included in the data set determined by the setting unit 111 and associated with the application ID supplied from selection unit 115, from the parameter types described in parameter value table 122. Next, incorporating unit 113 sets a value(s) of the extracted parameter type(s) to the parameter type(s) indicated by the data set determined by setting unit 111.

For example, when the data set shown in FIG. 5B is supplied from setting unit 111 to determination unit 112, and the user clicks on the OK button in the screen shown in FIG. 6B, incorporating unit 113 determines, by referring to parameter value table 122, parameters of the parameter type 'lighting' associated with application IDs A2, A4, and A6 and sets the values of the parameters to 20%.

As described above, when a parameter value has been set for an application, the parameter value is reflected also in another application(s) that refers to the same parameter type in information processing device 1. Thus, it is not necessary to set values of a single parameter type individually in information processing device 1. As a result, usability of setting parameters is improved.

2. Modified Embodiments

The foregoing description is directed to an embodiment of the present invention. The embodiment can be modified as described below. It is noted that the modifications to the embodiment described below can be combined.

2-1. Parameter Type Table

In the above embodiment, parameter type table 121 is used in determining an application ID(s) of an application(s) that refers to a parameter type whose parameter value has already been set for a particular application, and the setting is reflected in each of the determined application ID(s). It is possible to define, for each application, information on whether a parameter setting that has already been set for another application is incorporated into a parameter setting for the application. In this case, for example, as indicated by a dotted line in FIG. 2, a column indicative of a parameter dependency may be added to parameter type table 121. Specifically, a checkmark in this column indicates that a parameter setting for an application ID of the same line is incorporated from a parameter setting that has already been set for another application. The notation '-' in a matrix indicates that a parameter setting in the column for an application ID of the same line is not incorporated from a parameter setting that has already been set for another application. Thus, once a parameter is set for an application, whether or not a setting of a first application is incorporated into a second application, first and second applications that refer to a same parameter type can be determined for each application.

It is possible to rewrite data in the column of parameter dependency according to an input provided by a user via input device 13. Instead of the column of parameter dependency described above, a column indicating that the application is allowed or to incorporate prohibited from incorporating a parameter setting of the application to another application may be provided. Thus, a parameter dependency between applications is registered.

2-2. History

According to the above embodiment, an application ID selected by selection unit 115 is used for determining an application to which a setting is applied by incorporating unit 113. Main controller 11 of information processing device 1 may store selection history in storage unit 12 or RAM to analyze it, and change data of parameter type table 121 according to a result of the analysis.

Figure 7:
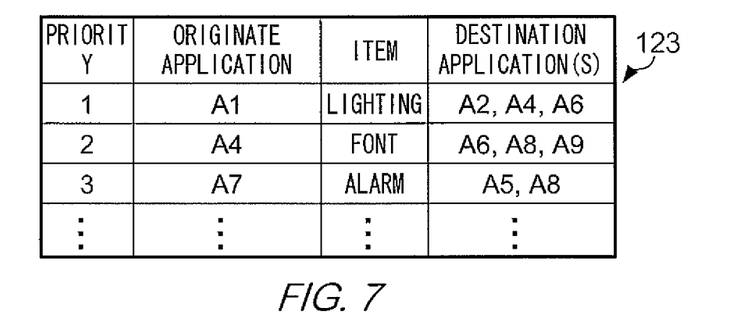
FIG. 7 is an example of a selection history according to a modified embodiment.

FIG. 7 shows an example of selection history according to a modified embodiment. As indicated by a dotted line in FIG. 1, selection history table 123 indicative of a history of selections shown in FIG. 7 is stored in storage unit 12. Selection unit 115 selects an application ID according to an input provided by the user in response to a content displayed by notifying unit 114, and stores the selected application ID in selection history table 123 each time a selection is made. In selection history table 123, a number indicative of a priority of a setting, an application ID (hereinafter referred to as 'an origination application ID') of an application for which a parameter has been set, parameter type, and an application ID (hereinafter referred to as 'a destination application ID') selected by selection unit 115 are stored correspondingly. For example, in the first selection shown in FIG. 7, a parameter value of 'lighting' is set for an application of application ID A1 and the value is reflected to the applications indicated by A2, A4, and A6.

In this case, main controller 11 of information-processing device 1 performs the functionality of changing unit 116 indicated by a dotted line in FIG. 4. Changing unit 116 analyzes selection history table 123 and changes data stored in parameter type table 121 according to a result of the analysis. For example, changing unit 116 extracts from selection history table 123 shown in FIG. 7 a predetermined number (for example, 30) of the newly recorded data items relating to the parameter type 'lighting'. Next, changing unit 116 calculates, for each application ID, a total number of appearances of an application ID in a data field of destination application ID and identifies an application(s) ID appeared fewer than a predetermined number of times. Next, changing unit 116 determines a line of the determined application ID in parameter type table 121 and changes a checkmark in the line and the column of 'lighting' to another notation.

As an example, in a case where changing unit 116 determines that an application ID A5 appeared fewer than the predetermined number of times in the column of destination application ID of selection history table 123, data field in line 'A5' and column 'lighting' of parameter type table 121 is changed to a notation '*' together with a bracket as shown in FIG. 2. In this case, an application ID A5 is not selected by determination unit 112 since the data having notation '*' is different from application IDs A2, A4, A6 for which a checkmark provided.

It is noted that the analysis described above is not necessarily a comparison of a number of appearances having a predetermined threshold. For example, a machine learning technique may be implemented to determine whether to rewrite data stored in parameter type table 121. Alternatively, each record in selection history may be weighed and points calculated for each data item, and whether to change data in parameter type table 121 is determined based on the calculated points. For example, a newer record is allocated a higher number of points. Stated simply, changing unit 116 analyzes accumulated records in the selection history, and changes data items stored in parameter type table 121 in association with an application ID based on a result of the analysis.

An introduction of the notation '*' different from '-' used by changing unit 116 instead of a checkmark will have effects as described below. A combination of an application ID with the notation '*' and a parameter type indicates that an application identified by the application ID has not yet been selected by another application more than the predetermined number of times for which the parameter type is set. Indication of an application ID in which the number of times a setting of the parameter type is applied to another application is lower than a threshold by the notation '*' makes it possible to distinguish the application ID from an application ID (described by the notation '-') of an application that does not refer to the parameter type. Thus, it is possible to restore data stored in parameter type table 121 by changing '*' to a checkmark after data stored in selection history table 123 is deleted, for example. Accordingly, when it is not necessary to restore the data in parameter type table 121, changing unit 116 may employ the notation '-' rather than a checkmark.

2-3. Selection

According to the above embodiment, selection unit 115 selects an application ID according to an input instruction provided by a user, and transfers the selected application ID to incorporating unit 113. It is possible to transfer all of the application IDs determined by determination unit 112 to incorporating unit 113. In this case, selection unit 115 can be omitted. In addition, notifying unit 114 can be omitted since it is not necessary to prompt the user to provide input instructions to be received by selection unit 115. In this case, incorporating unit 113 applies the setting to applications indicated by all of the application IDs determined by determination unit 112.

2-4. Location Detector

According to the above embodiment, regardless of a location of information processing device 1, when a parameter is set for an application, a value of the parameter of the same parameter type is set for other applications. It is possible to determine whether to apply a parameter setting depending on a location of information processing device 1. For example, as indicated by a dotted line in FIG. 1, information processing device 1 may include a location detector 15 including a GPS (GLOBAL POSITIONING SYSTEM) or the like, to measure a position of the device.

Figure 8A:
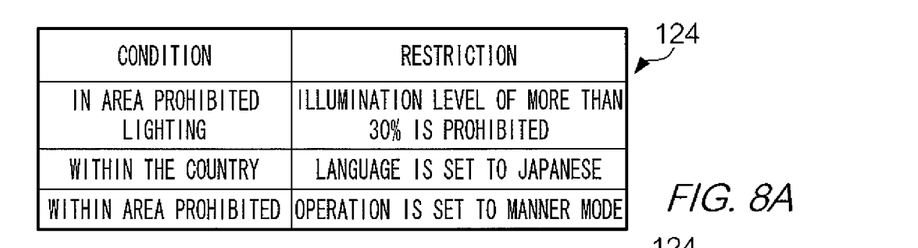
FIG. 8 shows an example of a condition table.

As indicated by a dotted line in FIG. 1, storage unit 12 may store a condition table 124 in which conditions of applying a setting to an application are defined. FIG. 8 shows an example of condition table 124. When location detector 15 measures a position of information processing device 1, incorporating unit 113 in FIG. 4 refers to condition table 124 to check whether the position measured by location detector 15 satisfies a condition in condition table 124. For example, if the measured position is a position within a theater or other facility registered as a place where use of a lighting device is prohibited, the position satisfies the condition in the first line of condition table 124 shown in FIG. 8A. Thus, in this case, a restriction in the first line and a column of restriction is imposed on information processing device 1. Thus, in this case, in information processing device 1 incorporating unit 113 is prohibited from applying a setting defining a lighting parameter that is 30% or more to other applications.

Thus, application of a parameter defining a lighting intensity greater than a threshold illuminance that has been set for a particular application to another application is prevented in a theater or other facilities where darkness must be maintained. It is noted that a restriction described in condition table 124 may also be imposed on setting unit 111. In other words, when a condition in condition table 124 is satisfied, it is possible to prohibit application of any settings by setting unit 111.

2-5. Measuring Unit

Figure 8B:
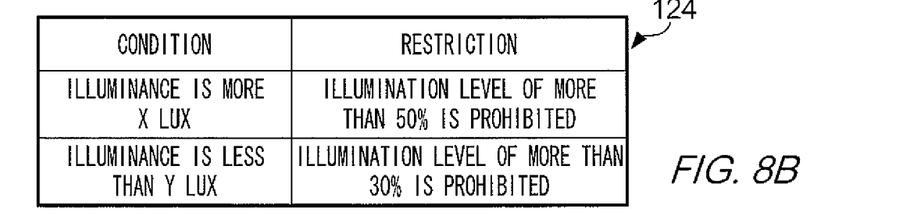

According to the above embodiment, regardless of an environment of information processing device 1, when a parameter value is set for an application, a value of the parameter of the same parameter type is set for another application. It is possible to determine whether to apply a setting based on an environment of information-processing device 1. For example, as indicated by a dotted line in FIG. 1, information-processing device 1 may include a measuring unit 16 including an illuminance meter or the like, to measure illumination of a space around the device. Second determination unit 113 shown in FIG. 4 refers to condition table 124 shown in FIG. 8B to check whether the illuminance measured by measuring unit 16 satisfies a condition in condition table 124. For example, if the measured illuminance is more than X lux, the condition in the first line of condition table 124 shown in FIG. 8B is satisfied. As a result, a restriction in the first line and the column of restriction is imposed on information-processing device 1. As a result, incorporating unit 113 is prohibited from applying a setting of more than 50% lighting to another application in information-processing device 1.

Thus, for example, when information-processing device 1 is used in a place where a light of high illuminance is provided, information-processing device 1 maintains a predetermined level of lighting so as to prevent difficulty in viewing a displayed content due to the high illuminance of the space. In other words, information-processing device 1 adjusts application of a setting according to the environment, to improve usability.

Measuring unit 16 may include detecting devices other than the illuminance meter. For example, a thermometer, a humidity meter, or a noise level meter may be provided. As an example, information-processing device 1 may be a mobile phone having a functionality of performing voice communication, which includes a tone generation unit that generates a ring tone for notifying a user of an incoming call. Assuming that a volume setting of the ring tone by the tone generation unit is performed by an application, measuring unit 16 measures the temperature and humidity using the thermometer and humidity meter, respectively. When the temperature lies within 18 to 28 degrees Celsius and the humidity lies within 45% to 65% RH (RELATIVE HUMIDITY), information-processing device 1 may set an upper limit for a parameter of a volume, so as to prohibit the parameter exceeding the upper limit as a result of applying a setting. This is because air conditioning is generally provided indoors, and a ring tone with lower volume can be heard more easily compared to outdoors. In addition, measuring unit 16 may measure a noise level using the noise level meter, to define the upper limit or the ring tone according to the measured noise level. Stated simply, measuring unit 16 is configured to measure a physical quantity indicative of an environment of information-processing device 1, such that incorporating unit 113 incorporates a setting based on the physical quantity measured by measuring unit 16.

As indicated by a dotted line in FIG. 1, information-processing device 1 may include a communication unit 17 to communicate communication unit 17 of another device and measure traffic volume per unit time or other indicators indicating a status of communications performed via communication unit 17. In this case, a predetermined condition regarding a status of a communication is provided in condition table 124, and when the condition is fulfilled, a restriction associated with the condition is imposed on incorporating unit 113 and/or setting unit 111. Stated simply, measuring unit 16 is configured to obtain an indicator of a status of communication performed by information-processing device 1 with another device, such that incorporating unit 113 incorporates a setting based on information obtained by measuring unit 16.

2-6. Exceptional Conditions

According to the above embodiment, determination unit 112 refers to parameter type table 121, so as to identify an application ID of an application that refers to a parameter type indicated by the data set determined by setting unit 111, the application being different from an application indicated by the data set. When a predetermined exceptional condition is fulfilled, a particular application ID may be excluded from selectable applications. In this case, since determination unit 112 does not select an application ID of an application satisfying the exceptional condition, incorporating unit 113 does not apply a parameter value set by setting unit 111 to the application satisfying the exceptional condition. The exceptional condition may be determined based on a functionality of an application.

For example, an exceptional condition is stored in storage unit 12, which defines whether application of a setting relating to a change of a parameter defining whether to measure a position using a GPS or the like is prohibited from being applied to an application configured to send location information indicative of the measured position to another device. Thus, while a position monitoring application is running to enable a parent to monitor a location of a child, a changed setting for another application made by the child will not affect the functionality of the position monitoring application.

2-7. Timing

Rules on handling of an application may be added to the column indicative of dependency in parameter type table 121 and condition table 124 according to the modified embodiment when the application is downloaded or installed, or executed for the first time. The rules may be defined by a user providing an input instruction via input device 13.

2-8. Display Controller

According to the above embodiment, notifying unit 114 displays on display 14 a list of application IDs determined by determination unit 112; however, notifying unit 114 may notify a user of information without using display 14. For example, information-processing device 1 may include a tone generating unit that generates a synthesized voice, whereby notifying unit 114 instructs the tone generating unit to output a voice message to notify a user of the information.

2-9. Program

A program executable by main controller 11 of information processing device 1 may be provided to a user by a magnetic storing medium including a magnetic tape and magnetic disk, optical storing medium including an optical disk, opto-magnetic storing medium, semiconductor memory, or other storing medium that can be read by a computer. Alternatively, the program may be downloaded via the Internet or other computer network. Main controller 11 is a mere example of a control means of information-processing device 1, and may be implemented by hardware other than a CPU, such as a designated processor, may be implemented as the controller means. There is no limitation as to how the functionalities of information-processing device 1 are implemented using hardware or software.

In summary, an information-processing device according to the present invention includes: a storage unit that stores parameter types used in executing application programs, each parameter type associated with an identifier of an application program; a setting unit that sets a value for a parameter used in executing a first application; a determination unit that determines, based on an association between the identifiers and parameter types, which association is stored in the storage unit, at least one second application program that uses a parameter of a parameter type the same as a parameter type for which a value is set by the setting unit; and an incorporating unit that incorporates the value for the parameter set by the setting unit into a value for a parameter used in executing the at least one second application program determined by the determination unit.

2-10. Information-Processing Device

Information-processing device 1 may be a mobile phone, PDA (PERSONAL DIGITAL ASSISTANT), portable music player, portable video player, game console, electronic book reader, navigation device, personal computer, or the like.

2-11. Application of a Setting

According to the above embodiment, incorporating unit 113 sets a parameter value used when executing the application determined by the application ID determined by determination unit 112 to a value indicated by a data set determined by the setting unit 111, so as to apply a setting. A value to be set is not necessarily the value indicted by the data set. The value may be a value generated based on the data set. For example, a mathematical function or coefficients may be introduced to generate a finalized value from the value indicated by the data set. Different functions or coefficients may be determined in advance for each originating application, destination application, or a combination thereof.

What is claimed is:
1. An information-processing device comprising:
a processor for executing an operating system;
a storage unit that stores parameter types used in executing application programs, each parameter type associated with an identifier of an application program;
a setting unit that sets a value for a parameter used in executing a first application in accordance with an input made by a user via an input device;
a determination unit that determines, based on an association between the identifiers and parameter types, which association is stored in the storage unit, at least one second application program that uses a parameter of a parameter type the same as a parameter type for which a value is set by the setting unit in response to the setting of the parameter used in executing the first application;

an incorporating unit that incorporates the value for the parameter set by the setting unit into a value for a parameter used in executing the at least one second application program determined by the determination unit;

a notification unit that notifies the user of the at least one second application program determined by the determination unit; and a selection unit that selects from the at least one second application program determined by the determination unit at least one application program, wherein the incorporating unit incorporates the value for the parameter set by the setting unit into a value for a parameter used in executing the at least one application program selected by the selection unit.

2. The information-processing device according to claim 1, further comprising:

an accumulating unit that accumulates a history of selections made by the selection unit; and a changing unit that analyzes the history accumulated by the selection unit and changes, based on a result of the analysis, parameter types stored in association with the identifiers in the storage unit.

3. The information-processing device according to claim 1, further comprising a measuring unit that measures a physical quantity of an environment of the information processing device, wherein the incorporating unit incorporates the value of the parameter based on the physical quantity measured by the measuring unit.

4. The information-processing device according to claim 1, further comprising an obtaining unit that obtains location information indicative of a position of the information-processing device, wherein the incorporating unit incorporates the value of the parameter based on the location information obtained by the obtaining unit.

5. The information-processing device according to claim 1, further comprising:

a communication unit that communicates with another device; and an obtaining unit that obtains information indicative of a status of a communication performed by the communication unit, wherein the incorporating unit incorporates the value for the parameter based on the information obtained by the obtaining unit.

6. The information-processing device according to claim 1, wherein:

the storage unit further stores information indicative of whether the incorporation of the value for the parameter by the incorporating unit is allow or prohibited; and the incorporating unit incorporates the value for the parameter set by the setting means to a value for a parameter used in executing application program registered as an application program to which the incorporation is allowable in the storage unit.

7. The information processing device according to claim 1, wherein:

the storage unit further stores a condition; and the determination unit excludes an application program satisfying the condition stored in the storage unit from selectable application programs.

8. A computer program that causes a computer to execute:

registering parameter types used in executing application programs, each parameter type associated with an identifier of an application program;

setting a value for a parameter used in executing a first application in accordance with an input made by a user;

determining, based on the association between the identifiers and parameter types, at least one second application program that uses a parameter of a parameter type the same as a parameter type for which a value is set in response to the setting of the parameter used in executing the first application;

incorporating the value for the set parameter into a value for a parameter used in executing the at least one determined second application program;

notifying the user of the at least one determined second application program;

selecting from the at least one determined second application program at least one application program; and incorporating the value for the set parameter into a value for a parameter used in executing the at least one selected application program.

* * * * *